(12) United States Patent
Lee

(10) Patent No.: US 10,534,490 B2
(45) Date of Patent: Jan. 14, 2020

(54) TOUCH DISPLAYING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Ming-Chuan Lee, New Taipei (TW)

(73) Assignees: HONGFUJIN PRECISION INDUSTRY (WUHAN) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/923,163

(22) Filed: Mar. 16, 2018

(65) Prior Publication Data

US 2019/0196617 A1 Jun. 27, 2019

(30) Foreign Application Priority Data

Dec. 27, 2017 (CN) .......................... 2017 1 1449896

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ............................... G06F 3/044; G06F 3/0412
See application file for complete search history.

(56) References Cited

U.S. PATENT DOCUMENTS

| 2015/0268758 | A1* | 9/2015 | Lo | G06F 3/0416 |
| | | | | 345/174 |
| 2017/0213499 | A1* | 7/2017 | Kong | G06F 3/0412 |
| 2018/0004333 | A1* | 1/2018 | Jeong | G06F 3/044 |
| 2018/0096666 | A1* | 4/2018 | Chung | G09G 3/3688 |
| 2018/0219025 | A1* | 8/2018 | Takahashi | G09G 3/3611 |
| 2018/0267666 | A1* | 9/2018 | Park | G06F 3/0412 |

* cited by examiner

*Primary Examiner* — Kent W Chang
*Assistant Examiner* — Andrew Lee
(74) *Attorney, Agent, or Firm* — ScienBiziP, P.C.

(57) ABSTRACT

A touch displaying device includes a housing, a displaying screen, a capacitive touch screen, a timing control board, a touch control board, a video control board, an LED driving board, a power control board, a first converting board, and a second converting board. The housing includes a first edge, a second edge, a first side edge, and a second side edge. The first converting board includes a timing signal adapter and a first electrode signal adapter. The second converting board includes a second electrode signal adapter. The first converting board, the timing control board and the touch control board are fixed in the housing and disposed adjacent to the second edge. The timing control board is disposed towards a side of the touch control board. The second adapter plate is fixed in the housing and disposed adjacent to an end of the second edge adjacent to the first side edge.

20 Claims, 4 Drawing Sheets

TOUCH DISPLAYING DEVICE

CROSS-REFERENCE TO RELATED APPLICATIONS

This application claims priority to Chinese Patent Application No. 201711449896.1, filed on Dec. 27, 2017, the contents of which are incorporated by reference herein.

FIELD

The subject matter herein generally relates to displaying devices, especially relates to a touch displaying device.

BACKGROUND

Touch displaying devices include a housing and a touch displaying module. The touch displaying module includes a timing control board, and a signal transmitter adapter and a signal receiver adapter connected to a touch layer. The timing control board, the signal transmitting adapter, and the signal receiving adapter are placed on an upper edge, a lower edge, and a side edge of a touch screen. Thus, cables connected to the timing control board, the signal transmitting adapter, and the signal receiving adapter cover most area of the touch screen. To avoid electrical interference between the cable and a video control board, the video control board should not be overlapped with the cable. Therefore, an area for installing the video control board on the touch screen is very limited.

BRIEF DESCRIPTION OF THE DRAWINGS

Implementations of the present technology will now be described, by way of example only, with reference to the attached figures.

DETAILED DESCRIPTION

Figure 1:
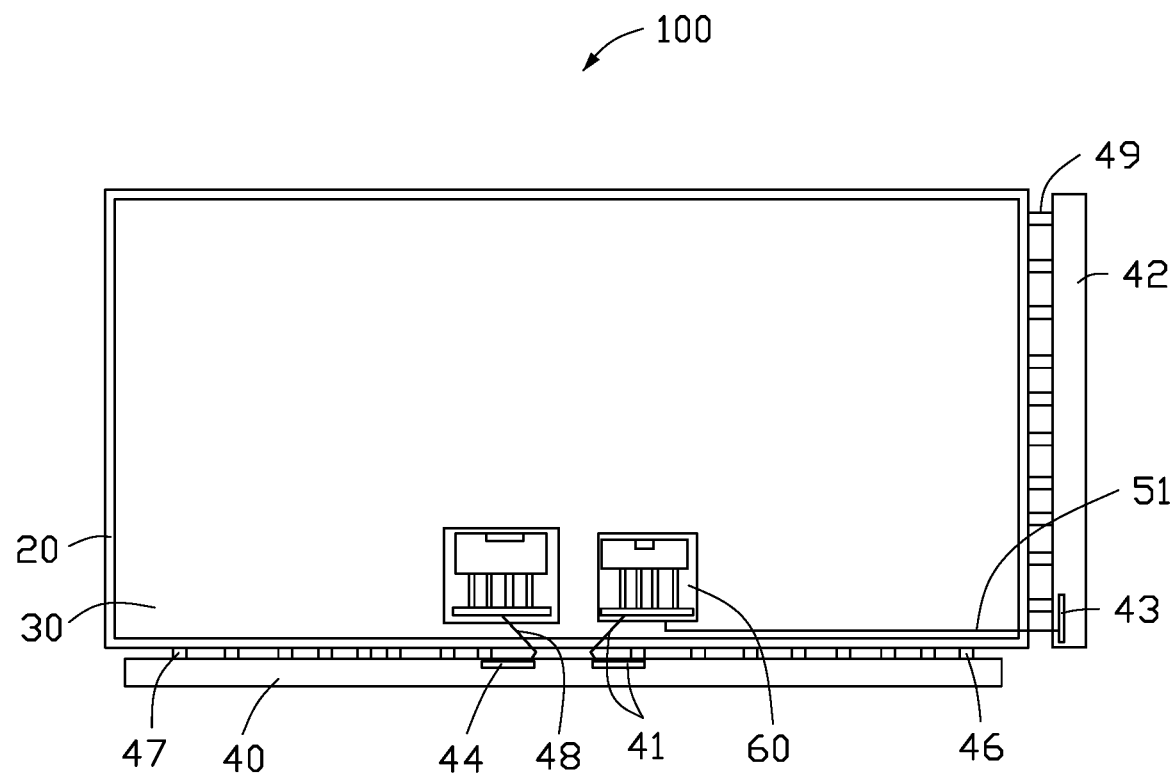
FIG. 1 is a schematic diagram of a touch displaying device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein. The disclosure is illustrated by way of example and not by way of limitation in the figures of the accompanying drawings, in which like references indicate similar elements. It should be noted that references to "an" or "one" exemplary embodiment in this disclosure are not necessarily to the same exemplary embodiment, and such references mean "at least one."

The term "comprising" means "including, but not necessarily limited to"; it specifically indicates open-ended inclusion or membership in a so-described combination, group, series, and the like.

Figure 2:
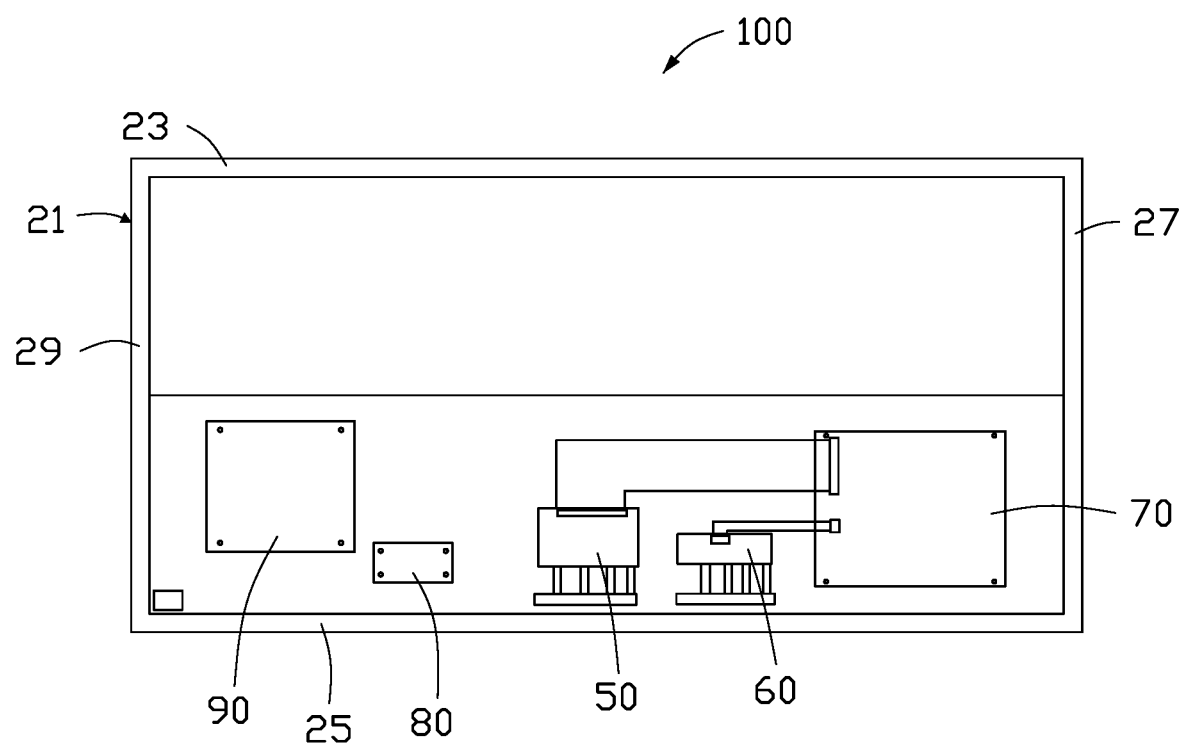
FIG. 2 is a schematic diagram of a rear view of the touch displaying device in FIG. 1.
Figure 3:
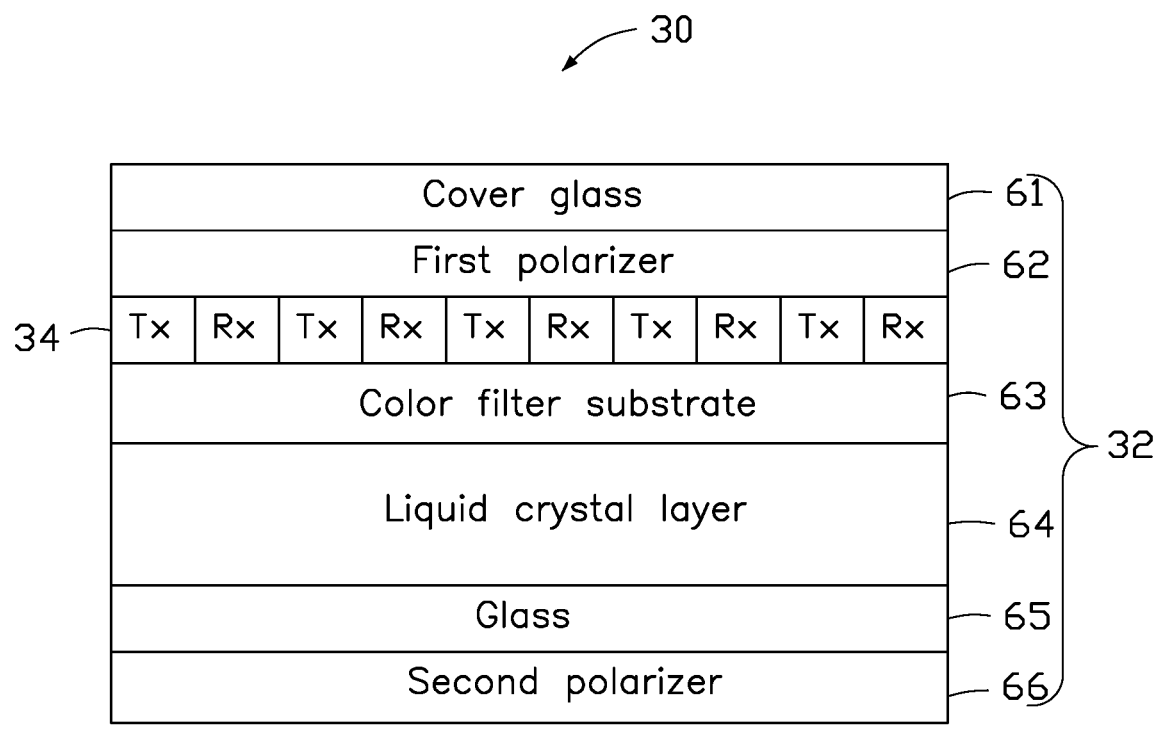
FIG. 3 is a schematic diagram of a touch displaying screen of the touch displaying device in FIG. 1.
Figure 4:
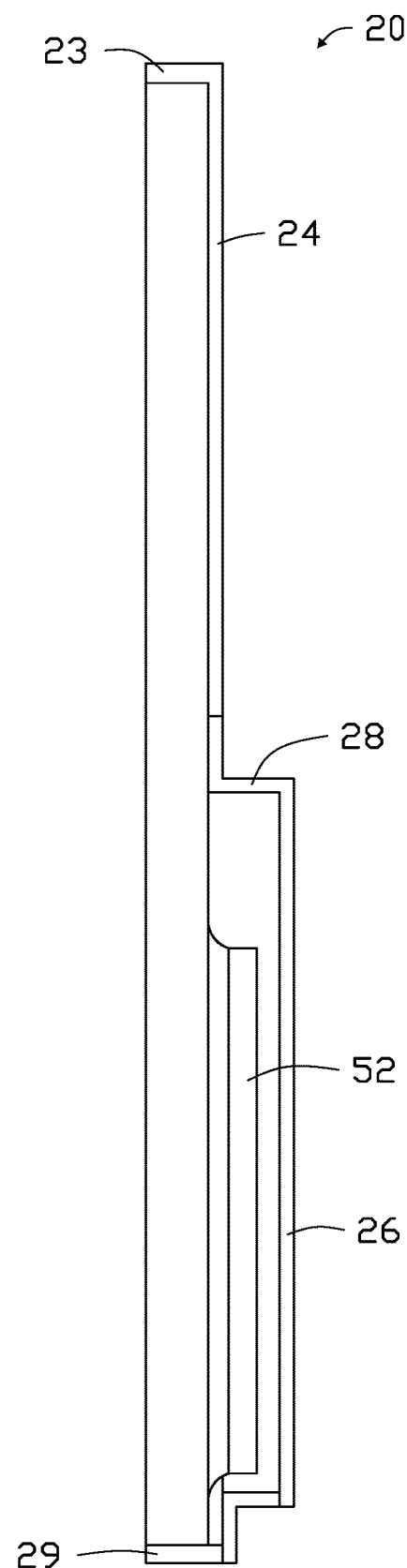
FIG. 4 is a side cross-sectional view of the touch displaying device in FIG. 1.

FIGS. 1-4 illustrate a touch displaying device 100 which includes a housing 20, a touch displaying screen 30, a first converting board 40, a second converting board 42, a timing control board 50, a touch control board 60, a video control board 70, an LED driving board 80, and a power control board 90. The touch displaying screen 30, the first converting board 40, the second converting board 42, the timing control board 50, the touch control board 60, the video control board 70, the LED driving board 80, and the power control board 90 are received in the housing 20.

The touch displaying screen 30 includes a displaying screen 32. The displaying screen 32 includes a cover glass 61, a first polarizer 62, a color filter substrate 63, a liquid crystal layer 64, a glass 65, and a second polarizer 66 disposed in an order from top to bottom. The first converting board 40 includes a timing signal adapter 44. The timing signal adapter 44 is electronically connected to the displaying screen 32. The timing signal adapter 44 is electrically connected to the displaying screen 32 through a first flexible printed cable 46. The timing signal adapter 44 is electrically connected to the timing control board 50. The timing control board 50 is configured to control the display screen 32 to display images. The timing signal adapter 44 and the timing control board 50 are connected by a first flexible flat cable 48.

The touch displaying screen 30 includes a capacitive touch screen 34. A number of first electrodes Tx and a number of second electrodes Rx are etched on the capacitive touch screen 34. The first electrode Tx and the second electrode Rx are perpendicular to each other. The capacitive touch screen 34 is embedded between the color filter substrate 63 and the first polarizer 62.

The first converting board 40 includes a first electrode signal adapter 41. The second converting board 42 includes a second electrode signal adapter 43. The first electrode signal adapter 41 is electrically connected to the first electrode Tx. The first electrode signal adapter 41 is electrically connected to the first electrode Tx through a second flexible printed cable 45. The first electrode signal adapter 41 is electrically connected to the touch control board 60. The first electrode signal adapter 41 is electrically connected to the touch control board 60 through a second flexible flat cable 47. The second electrode signal adapter 43 is electrically connected to the second electrode Rx through a third flexible printed cable 49. The second electrode signal adapter 43 is electrically connected to the touch control board 60. The second electrode signal adapter 43 is electrically connected to the touch control board 60 through a third flexible flat cable 51. The first electrode signal adapter 41 and the second electrode signal adapter 43 transmit electrical signals from the first electrode Tx and the second electrode Rx to the touch control board 60 and a touched position on the capacitive touch screen 34 is determined through the touch control board 60.

The timing control board 50, the touch control board 60, the power control board 90, and the LED driving board 80 are electrically connected to the video control board 70. The video control board 70 controls the displaying screen 32 to display content according to the touched position of the capacitive touch screen 34.

The housing 20 includes a frame 21 and a cover 22 fixed to the frame 21. The cover 22 may be a rear cover. The frame 21 includes a first edge 23, a second edge 25, and a first side edge 27, and a second side edge 29 connected between the first edge 23 and the second edge 25. The first edge 23 may be a top edge and the second edge 25 may be a bottom edge. The first converting board 40, the timing control board 50, and the touch control board 60 are disposed adjacent to the second edge 25. The timing control board 50 is disposed towards a side of the touch control board 60 and disposed adjacent to the touch control board 60. The video control board 70 is disposed adjacent to the second edge 25 and disposed towards a side of the touch control board 60 close to the first side edge 27. The power control board 90 and the LED driving board 80 are disposed adjacent to the second edge 25 and disposed towards a side of the timing control board 50 close to the second side edge 29. The second converting board 42 is disposed adjacent to the first side edge 27 and the second electrode signal adapter 43 is disposed adjacent to the second edge 25.

The rear cover 22 includes an upper plate 24, a lower plate 26, and a connecting plate 28 connecting the upper plate 24 and the lower plate 26. In a direction perpendicular to the touch screen 30, a distance between the lower plate 26 and the touch screen 30 is greater than a distance between the upper plate 24 and the touch screen 30. A receiving area 52 is defined between the lower plate 26 and the touch screen 30. The video control board 70, the touch control board 60, the timing control board 50, the power control board 90, and the LED driving board 80 are received in the receiving area 52.

The exemplary embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A touch displaying device comprising:
   a housing comprising a frame and a rear cover fixed to the frame, the frame comprising a first edge, a second edge, and a first side edge and a second side edge connected between the first edge and the second edge;
   a displaying screen;
   a capacitive touch screen comprising a plurality of first electrodes and a plurality of second electrodes;
   a power control board;
   a timing control board connected to the power control board;
   a touch control board connected to the power control board;
   a video control board connected to the power control board;
   a LED driving board connected to the power control board;
   a first converting board comprising a timing signal adapter and a first electrode signal adapter, the timing signal adapter electronically connected to the displaying screen and the timing control board, the first electrode signal adapter electrically connected to the first electrode and the touch control board;
   a second converting board comprising a second electrode signal adapter, the second electrode signal adapter electrically connected to the second electrode and the touch control board;
   wherein the first converting board, the timing control board and the touch control board are disposed adjacent to the second edge, the timing control board is disposed towards a side of the touch control board and disposed adjacent to the touch control board, the second electrode signal adapter is disposed adjacent to the first side edge and the second edge.

2. The touch displaying device as claimed in claim 1, wherein the video control board is disposed adjacent to the second edge and disposed towards a side of the touch control board close to the first side edge, the power control board and the LED driving board are disposed adjacent to the second edge and disposed towards a side of the timing control board close to the second side edge.

3. The touch displaying device as claimed in claim 2, wherein the rear cover comprises an upper plate, a lower plate and a connecting plate connecting the upper plate and the lower plate, in a direction perpendicular to the touch screen, a distance between the lower plate and the touch screen is greater than a distance between the upper plate and the touch screen.

4. The touch displaying device as claimed in claim 3, wherein a receiving area is defined between the lower plate and the touch screen, the video control board, the touch control board, the timing control board, the power control board and the LED driving board are received in the receiving area.

5. The touch displaying device as claimed in claim 1, wherein the capacitive touch screen is embedded between the color filter substrate and the first polarizer.

6. The touch displaying device as claimed in claim 1, wherein the timing signal adapter is electrically connected to the displaying screen through a first flexible printed cable.

7. The touch displaying device as claimed in claim 1, wherein the timing signal adapter and the timing control board are connected by a first flexible flat cable.

8. The touch displaying device as claimed in claim 1, wherein the first electrode signal adapter is electrically connected to the touch control board through a second flexible flat cable.

9. The touch displaying device as claimed in claim 1, wherein the first electrode signal adapter is electrically connected to the first electrode through a second flexible printed cable.

10. The touch displaying device as claimed in claim 1, wherein the second electrode signal adapter is electrically connected to the touch control board through a third flexible flat cable.

11. A touch displaying device comprising:
    a housing comprising a first edge, a second edge, a rear cover connected between the first edge and the second edge, a first side edge and a second side edge connected two ends of the first edge and the second edge;
    a displaying screen;
    a capacitive touch screen etching a plurality of first electrodes and a plurality of second electrodes;
    a power control board;
    a timing control board connected to the power control board;
    a touch control board connected to the power control board;
    a video control board connected to the power control board;

a LED driving board connected to the power control board;

a first converting board comprising a timing signal adapter and a first electrode signal adapter, the timing signal adapter electronically connected to the displaying screen and the timing control board, the first electrode signal adapter electrically connected to the first electrode and the touch control board; and a second converting board comprising a second electrode signal adapter, the second electrode signal adapter electrically connected to the second electrode and the touch control board;

wherein the first converting board, the timing control board and the touch control board are fixed in the housing and disposed adjacent to the second edge, the timing control board is disposed towards a side of the touch control board, the second electrode signal adapter is fixed in the housing and disposed adjacent to an end of the second edge adjacent to the first side edge.

12. The touch displaying device as claimed in claim 11, wherein the video control board is disposed adjacent to the second edge and disposed towards a side of the touch control board close to the first side edge, the power control board and the LED driving board are disposed adjacent to the second edge and disposed towards a side of the timing control board close to the second side edge.

13. The touch displaying device as claimed in claim 12, wherein the rear cover comprises an upper plate, a lower plate and a connecting plate connecting the upper plate and the lower plate, in a direction perpendicular to the touch screen, a distance between the lower plate and the touch screen is greater than a distance between the upper plate and the touch screen.

14. The touch displaying device as claimed in claim 13, wherein a receiving area is defined between the lower plate and the touch screen, the video control board, the touch control board, the timing control board, the power control board and the LED driving board are received in the receiving area.

15. The touch displaying device as claimed in claim 11, wherein the capacitive touch screen is embedded between the color filter substrate and the first polarizer.

16. The touch displaying device as claimed in claim 11, wherein the timing signal adapter is electrically connected to the displaying screen through a first flexible printed cable.

17. The touch displaying device as claimed in claim 11, wherein the timing signal adapter and the timing control board are connected by a first flexible flat cable.

18. The touch displaying device as claimed in claim 11, wherein the first electrode signal adapter is electrically connected to the touch control board through a second flexible flat cable.

19. The touch displaying device as claimed in claim 11, wherein the first electrode signal adapter is electrically connected to the first electrode through a second flexible printed cable.

20. The touch displaying device as claimed in claim 11, wherein the second electrode signal adapter is electrically connected to the touch control board through a third flexible flat cable.

* * * * *